INVENTORS,
VERNON R. WEINGART
O. WAYNE HANNUM
BY

Jay & Jay

ATTORNEYS

Feb. 12, 1957  V. R. WEINGART ET AL  2,780,898
METHOD AND APPARATUS FOR TYING BAGS
Filed Dec. 20, 1952  5 Sheets-Sheet 4

INVENTORS,
VERNON R. WEINGART
O. WAYNE HANNUM
BY
Fay & Fay
ATTORNEYS

Fig. 9

United States Patent Office 2,780,898
Patented Feb. 12, 1957

2,780,898

METHOD AND APPARATUS FOR TYING BAGS

Vernon R. Weingart, Mantua, and O Wayne Hannum, Kent, Ohio

Application December 20, 1952, Serial No. 327,074

17 Claims. (Cl. 53—14)

This invention, relating as indicated to an automatic bag tying machine, is particularly directed to a machine for automatically crimping and tying a filled bag of aggregate without any manual aid whatsoever. Though this machine is particularly adapted for the potato industry, it may be used with a great variety of aggregate, or bulk materials, such as potatoes, apples, oranges, beans, etc. In the retail grocery field, however, 5, 10, 15 and 25-pound bags have become increasingly used, requiring considerably greater problems of sorting and weighing of the commodities, as well as the difficulties of crimping and tying the bags. It is to this problem of automatically crimping and tying the bags with a secure tie, which can be readily opened by inspectors, checkers or housewives, and re-tied, that this invention relates.

One particular advantage of this particular machine is that it automatically crimps the bag and ties it, leaving a neck or handle to permit the bag to be readily handled at the farm, in the wholesale or retail establishment, or the home. Particularly, the use of these smaller bags, as mentioned above, has brought about many problems and large expense in packaging, since from seven to twenty times as many bags must be filled, weighed and tied as was necessary with the larger size bags. Whatever is said in this connection as applying to the potato industry, is equally true of other vegetable products, such as onions, beans, carrots, cabbages, turnips, oranges, lemons, etc., and possibly to many bulk commodities.

In order to make this operation of tying more efficient, it has been necessary to reduce the cost of this single operation. In the past it has been customary to use a hand tying tool and a looped wire tie. The bag is crimped by hand and the tie is placed about the neck of the bag, and the loops placed over the hook ends of the tying tool. The tool is then pulled toward the operator, thus twisting the tie a maximum of about 2½ turns. When the tool is released toward the bag, the hook is disengaged from the loops of the tie, completing the operation. This is exceptionally hard work requiring strong, quick hands, and very few people are able to average more than 300 bags per hour for any period of time. This results in a rather costly operation, which reduces the profit to the potato grower and requires a large amount of manual labor. It is for these reasons that a completely automatic bag tying machine is necessary.

Still another example of a semi-automatic machine to tie bags is a small electric-powered device, embodying a friction clutch, which permits the crimped bag to be forced within a pair of twisting arms, after which a tie is inserted in the arms and the crimped neck of the bags removed from the arm engaging the clutch to tie the bag. Manual movement of the crimped neck of the bag operates the friction clutch, to engage and disengage the tying arms. With this device a man may tie up to 750 bags per hour but the manual effort of lifting and crimping is still necessary. The crimping is, of course, the greater part of the work of tying the bag and this must be done by hand. The only real manual effort that is saved by this device is that the machine performs the operation of twisting the tie, which is the least tiresome of all. Other closure means have been used in connection with bag tying, and these are generally of the staple type, the heavy gauge wire ring type, and several others, about to be mentioned.

The most popular for many uses is still the twisted tie, which this new machine will perform. The big advantage of the twisted tie closure over these others mentioned, is that a bag tied with the twisted tie can easily be opened and re-tied with the same tie, for inspection at any time, whether it be at the warehouse, grocery store or in the home. It also performs the simplest method of closure for the housewife, which is not true of the sewn or heavy wire ring types. For certain operations on a large scale sewing is very popular, although the automatic sewing machine requires hand feeding to obtain high rates of speed. Furthermore, these bags lack a neck or ear, which makes them more difficult to grab. In many operations it is found that the line of perforations made by the needles during the sewing process, weakens the bag and in handling the bag is unintentionally torn open.

Still another type of closure means consists of a heavy gauge wire ring which is wound in a tie around a crimped neck and fastened securely thereto. This heavy wire requires a pair of pliers or wire cutters to open it and cannot be readily replaced. To open the bag a knife is frequently used below the wire and this, in turn, destroys the bag.

Thus it may be seen that for a great number of bagged products, a few of which have been listed above, it is necessary to provide these packaged products with a twisted tie, which can be readily opened and closed by the wholesaler or retailer, or the buyer for inspection. For convenient handling of a bag, a neck is indeed helpful and a twisted tie provides this neck in an excellent manner. For these reasons a twisted tie is necessary, even though it is difficult to crimp and tie the bag with it.

An object of this invention is to automatically crimp and tie a bag with a twisted tie.

A further object of this invention is to take a filled bag of aggregate, crimp the neck of the bag between a pair of belts, forcing it into an enclosed portion and encompassing said crimped neck with a twisted tie and discharging same from the apparatus.

A further object of this invention is to crimp a filled bag of aggregate, feed a twisted tie on one side of the crimped neck of the bag, cause a pair of arms to pick up said tie, drawing the same around the neck of the bag and twisting it and releasing said crimping means and discharging said bag from the apparatus.

A further object of this invention is to automatically crimp and tie filled bags of aggregate at a high rate of speed with a twisted tie, which may be removed by inspectors and users, and to do same by crimping the neck of the bag between a pair of belts, forcing the crimped neck into an enclosed portion, feeding a twisted tie on one side of the neck, causing a pair of arms to advance in a timed relationship to pick up said tie, withdrawing it around the neck of the bag and twisting the ends together, and further including means for releasing the crimped neck of the bag and the tie from the apparatus.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of the various mechanical forms in which the principle of the invention may be used.

*General description of bag tying machine*

Generally, our new and improved automatic bag tying apparatus is adapted to be associated with an automatic filling device, which will weigh out and measure a quantity of aggregate, possibly potatoes, in 5, 10, 15, 25 or 50 pound lots, and is adapted to take these open bags, crimp the upper portion of the bag into an enclosed section and secure around the neck of the bag a twisted tie, and twist said tie at least 2½ turns in order to fasten the bag securely with the tie. The machine is adapted to perform this operation at a rate of approximately 1200 to 1800 bags per hour, and probably could average from 1000 to 1200 bags readily for a full hour.

Standard commercial wire ties of either the upset end or loop end variety may be used; however, loop end ties are preferred since they lend themselves to more rapid usage. If the upset end were used, they would be approximately 6″ long and of 18 gauge metal. The loop end ties are approximately 5½″ in length and of annealed steel.

The apparatus is essentially a composition of electrical and mechanical motions, with electric switches being employed at various points in the tying cycle to operate certain mechanism, such as the tie dropper, the "kick-off," etc. Briefly, the apparatus will be described in its overall function and then the specific parts and the description of them will follow.

Figure 1:
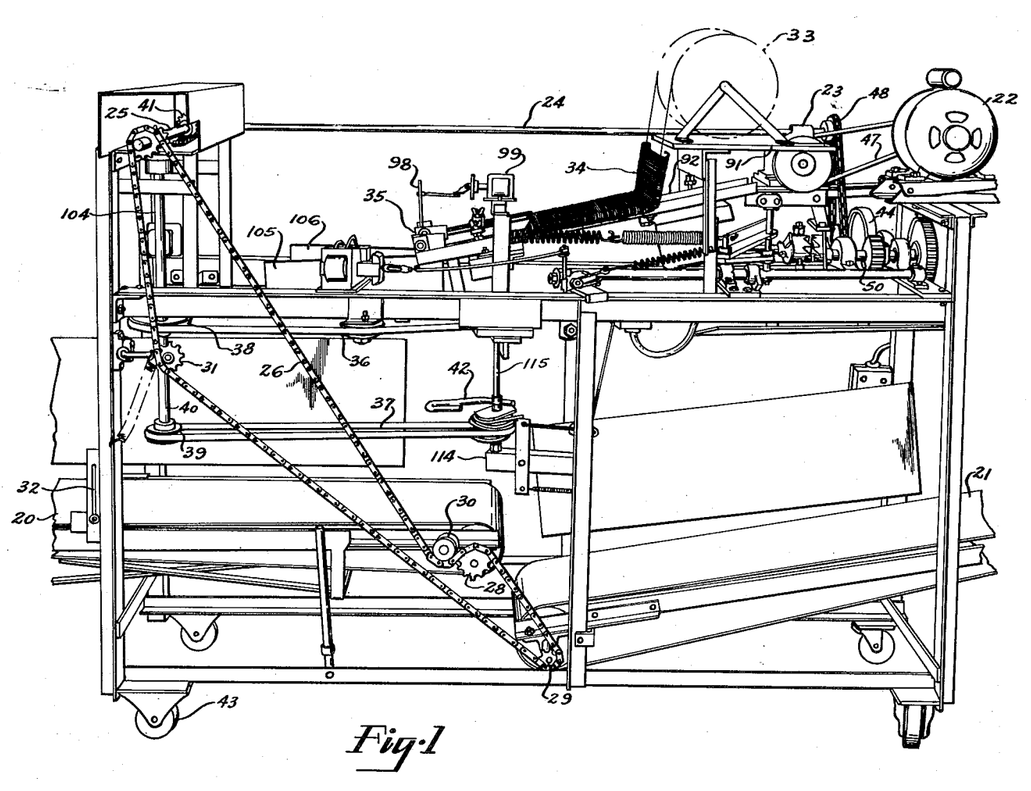
Fig. 1 is an overall view of our improved bag tying apparatus, showing the feeding conveyors, discharge conveyors and power means, together with the crimping and tying arms.

In Fig. 1, 20 shows a conveyor extending from the left of the figure to bring filled bags of bulk material to the crimping portion of the apparatus. The sloped conveyor 21 to the right of the machine carries the filled bag, which has been crimped and tied, to any associated apparatus to the right. Power is supplied by an electric motor 22, though a gasoline engine may be used. Only a single motor is necessary for the overall apparatus, and this is used through a reduction gear 23 to drive the cam shafts and tying arm and to operate the conveyor belts and the crimping belts. Briefly, the power extends from the righthand side of the figure and motor 22 to drive shaft 24 to the transverse drive shaft 25, which in turn is connected by a chain 26 to the conveyors. Said chain is connected by sprocket 28 to the first of said conveyors and by another sprocket 29 to the second of said conveyors. Idling sprockets 30 and 31 provide for certain adjustment in the pulley and in the height of the conveyor. This is, of course, necessary when the bag size is changed from 5 to 10 or 25 pounds and back again. Adjustment and securing means for the height of the conveyor are shown at 32. At the top of the figure is a roll of ties 33 and a sloped feeding means 34, together with the tie dropper assembly shown generally at 35, which feeds the ties to a magnet and to the tying arms shown in this figure.

In connection with the description of this machine, an open bag enters on the conveyor 20 and is crimped by means of the crimping belts, one of which is shown at 36 and guided down the conveyor by means of a lower guide belt 37, both of which have driving pulleys 38 and 39 connected to a vertical drive shaft 40 which is driven by means of a bevel gear pair 41. One of these vertical drive shafts is on each side of the conveyor belt. The associated means for advancing the tying arm around the neck of the bag and picking up a tie and retracting the same in a tying cycle, is less clearly shown in this view and will be described in connection with the other figures. At various points in the cycle solenoids are used to actuate the various devices, such as the kick-off means, shown generally at 42, as well as the tie dropper, 35, etc.

*Feeding, crimping and tying operations*

The apparatus is completely portable and mounted within a structural frame consisting in general of angle members, though other framing means could be used, and is mounted upon swivel casters designated 43. Some or all of the mechanisms mentioned earlier are shown in greater detail in connection with Fig. 2, where the belts 36 and 37 are shown, as well as the guide members and crimping pulleys. As the crimping belts approach one another, guides 105 and 106 are needed on either side of the pulley and spaced outwardly therefrom to guide the bag while being crimped between the crimping pulleys 45 and retained in a triangular shaped opening between the two crimping pulleys and the crimp holder 46. It is at this point in the cycle that a tie is dropped behind the crimped bag, during which time a pair of tying arms advance to engage the tie on a magnet to crimp the bag and to complete the tie by twisting it around the neck of the bag. Following this point in the cycle the crimp holder is released by another mechanism and the kick-off mechanism gives the bag and extra push to release it from the conveyor means onto the second conveyor 21 and off to storage.

*Sprocket, clutch and time delay*

Figure 9:
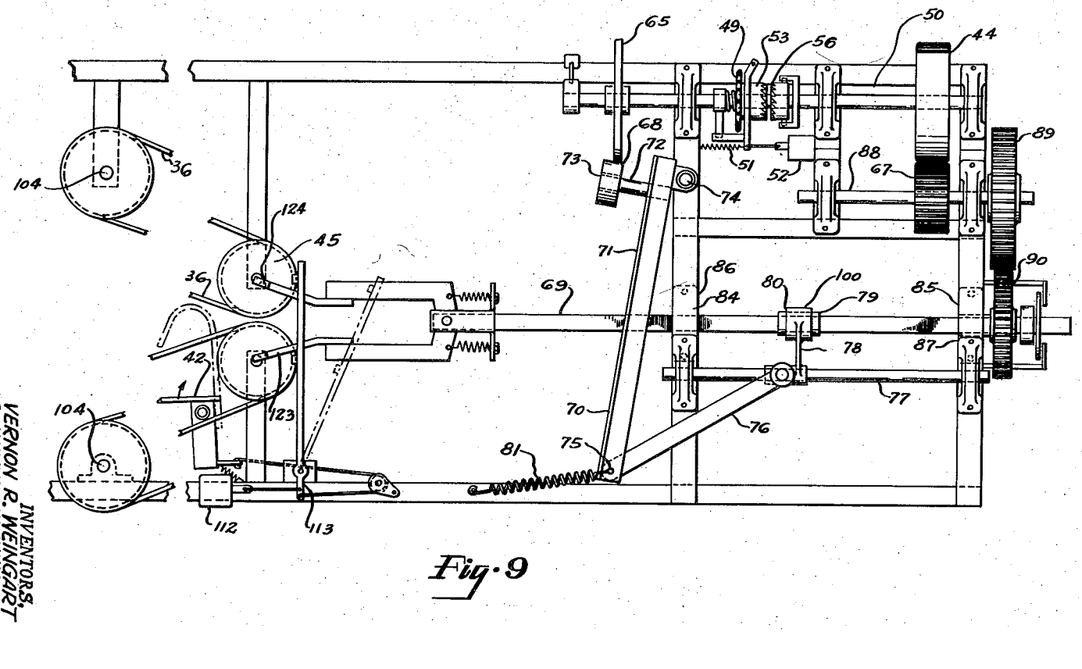
Fig. 9 is a top view of the bag tying arms and associated power means.

Further in connection with this apparatus, 22 shows a motor, as described above, and 47 is a pulley belt connecting said motor to a gear reduction unit 23. On one side of the gear reduction unit is a small sprocket 48 and on the other side is a clamping means to join the other side of the shaft through the gear reduction unit to a longitudinal shaft, which drives the crimping belts 36 and the conveyor belts 20 and 21. The small sprocket 48 is connected by means of a chain belt to a large sprocket 49, shown particularly in Fig. 3, which idles on the driving shaft 50. On said shaft is a large intermittent gear 44, which drives the tying arms through intermediate gears. On the other side of the driving shaft is a sprocket clutch and clutch shifter, seen in Figs. 3 and 9 preferably, which has a spring 51 connected to a pivoted shifter arm 60 and the frame, as well as a solenoid 52 to operate the clutch. 56 shows the driven section of the clutch. On the driven portion of the clutch is a time delay mechanism, which consists of a yoke portion 54 which is fixed on the shaft, and a pair of studs 55 secured to said clutch 56 which is free to rotate on said shaft, said studs being diametrically opposed to one another. These are connected by means of springs to the yoke member 54, which is in turn keyed to the shaft. When the clutch becomes engaged said yoke turns over approximately 180° before contacting the clutch, thus driving the shaft. This mechanism provides the necessary time delay in connection with this apparatus, allowing the tie to fall to the magnet and provides sufficient time for the tying hooks to pick up said tie. When the clutch sections become engaged in said apparatus, the two sections turn freely on the shaft until the studs engage the yoke. Following this the drive shaft 50 turns the cam to operate the tying arm assembly. Upon completion of the operation when the clutch is disengaged, the extension spring members, not shown, between the studs and the yoke pulls back the driven section to its original position with relationship to the yoke.

Figure 3:
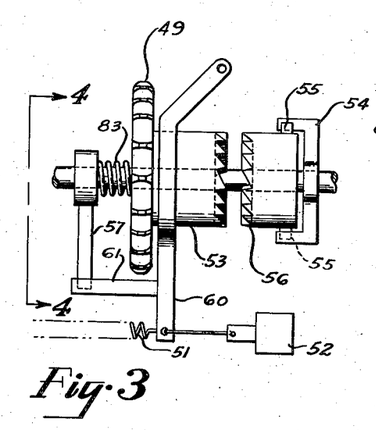
Fig. 3 is a vertical view of the cam shaft, clutch, clutch solenoid and time delay.
Figure 4:
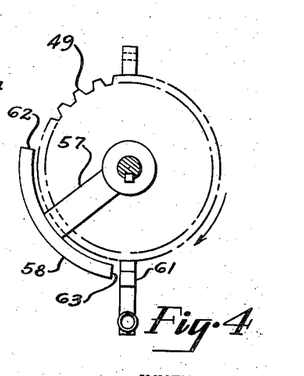
Fig. 4 is an end view of the same mechanism along the line 4—4.

Further in connection with said clutch is a clutch holder arm portion 57 on the left of the clutch in Fig. 3, keyed to the hub, which has a segmental portion 58 in the form of an arc extending from said arm. This mechanism is associated with the clutch shifter 60, which has connected to it on the right a solenoid 52 to engage the clutches, and on the left spring means 51 to disengage the clutches. In addition there is an extension arm 61 extending axially and perpendicularly from said clutch shifter. Said apparatus permits the clutch to be held in engagement for a part of a revolution of the cam shaft, even though the clutch solenoid is de-energized before the revolution is complete. This permits the complete cycle of operations to be completed. The operation of this clutch holder is as follows. Solenoid 52 moves the clutch shifter 60 to the right, thus allowing the clutch sections to engage. This of course moves the extension arm 61 enough to the right so that arm 57 and segmental portion 58 will just clear the ends of the extension arm 61. After a suitable amount of cam shaft rotation end 62 of the segmental portion 58 passes by the end of arm 61. The solenoid can now be deenergized at any time because segmental portion 58 prevents extension arm 61, secured to the clutch shifter 60, from moving to the left. When end 63 of segmental portion 58 moves past the end of arm 61 the clutch and clutch shifter may disengage. Other means in the apparatus provides for the completion of the tying cycle once it has begun even though the solenoid is disengaged. Thus to return for a moment to the reduction gear, it may be seen that the sprocket on the slow speed end of the gear reduction unit drives the large sprocket by means of a roller chain, and this, in turn, drives the cam or driving shaft 50. The sprocket 49, which has one face of a saw-tooth clutch welded to it, is idling freely on the shaft 50. Sprocket clutch unit 56 is held from engaging the other half of the clutch member 53 by the clutch shifter arm 60. This arm is hinged at the top and is held at the lower end by an extension spring 51 and the clutch solenoid 52. The shifter arm, of course, moves from left to right when the clutch solenoid 52 is energized. On said shaft is a large intermittent gear 44, which ties and operates the twisting of the tying arm assembly. Also on this shaft is a cam 65 which times and operates the tying arm assembly and pull-back mechanism. It may be seen that this cam could perform a timing operation alone and have hydraulic or other means for furnishing power for the horizontal motion of the tying arm assembly. In addition, on this shaft there is a switch tripping assembly, which temporarily opens a switch at the proper time. The energizing of the clutch solenoid 52 pulls hinged shift arm 60 from left to right, as shown in the figure, thus allowing a spring 83 mounted on the cam shaft to push the sprocket clutch assembly into engagement with the other half section of the clutch. After the time delay mechanism, in the form of a yoke, has permitted the tie to drop, the cam shaft begins to rotate. It will be seen at this point that the cam shaft begins to turn and that the intermittent gears 44 and 67 are not in mesh, and they will not come into mesh until the cam shaft has rotated approximately 90°. At this point the cam 65 will immediately begin to force the cam follower 68 away from the cam shaft. This is seen more clearly in connection with the detailed picture of the cam shaft.

*Tying arm assembly and pull back mechanism*

In continuing the description of this apparatus it should be stated that the pull-back mechanism controls the horizontal back and forth movement of tying arm shaft 69 and assembly shown generally at 70. The shaft 72 is fastened rigidly to arm 71. The cam follower is fastened to shaft 72 and is free to rotate on its bearings 73. Thus rotation of a cam causes the follower and shaft to be pivoted about the shaft and bearing 74. The opposite end of said arm 71 is fastened through a free fitting, vertical shaft or pin 75 to a short arm 76 which, in turn, is fastened through another free fitting vertical pin to member 78. The cross-member 78 is free to slide on shaft 77 which is mounted parallel with the tying arm shaft 69. Fastened rigidly and perpendicularly to the shaft 77 is an arm 78 which is fastened to shaft 69. Though we have described shaft 77 as fixed and cross member 78 as moveable relative thereto, the reverse may be the case if the shaft were longer and made slideable in its pillow blocks.

A round bushing 79, with a square hole, is fastened rigidly to the tying arm shaft 69. The arm 78 is adapted to fit over the bushing 79. A flanged sleeve bearing 80 is placed over bushing 79 on the inside of arm 78 to take the thrust. Arm 78 and bearing 80 are then clamped tightly together between two collars, which are fastened rigidly to the bushing. This fastens the arm 78 rigidly to the shaft while leaving the shaft free to rotate. In addition there are fastened to the ends of cam follower arm 71 extension springs 81, which keep the cam follower pressed tightly against the cam.

The operation of the pull-back mechanism is as follows: When the cam begins to rotate, it forces the cam follower 68 away from the cam shaft in a horizontal direction. This causes the cam follower extension 72 to turn on the pull-back arm shaft and bearing 74. Thus shaft 71 forces the short arm 76 against return spring 81 so that the cross shaft 78 slides on shaft 77 forcing the tying arm rearward. Although the cam determines and regulates the position of the tying arm shaft at all times, it actually supplies the force for only the backward movement of the tying arm shaft. The return spring 81 supplies the power for all of the forward motions of the tying arm shaft and assembly.

*The tying arm shaft rotation*

The tying arm shaft 69 is mounted in two bushings 84 and 85 and is free to slide therethrough. These bushings are cylindrical on the external side and square on the internal side, and are fastened rigidly to the inner face of two ball bearing pillow blocks 86 and 87. Also fastened rigidly to the outside diameter of the rear bushing 85 is a spur gear 90, which meshes with a large spur gear 89 which is keyed to the shaft 88. The small intermittent gear 67 is also keyed to this shaft. Therefore, when the intermittent gears 44 and 67 come into mesh, shaft 88 is driven, which in turn causes gear 89 to drive gear 90, thus causing the tying arm shaft to rotate. While gears 44 and 67 are in mesh, gear 67 makes but one revolution, but because of the difference in ratios, and the number of teeth on each gear, the tying arm shaft rotates three times. When the intermittent gears are out of mesh, their peripheral surfaces ride against each other, thereby preventing gear 67 from having rotating movement during this period. This means that the tying arm assembly 70 will always be held perfectly horizontal except during the twisting operation.

*Tying arm assembly and tie dropper*

Figure 8:
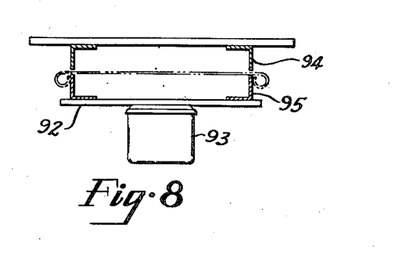
Fig. 8 is a cross-sectional view through the tie dropper feed mechanism along the lines 8—8 of Fig. 6.

The wire ties used in connection with this machine are preferably of the loop end variety as shown in Fig. 8 and are mounted on a pair of wires frequently in a roll. The ties feed from said roll on a platform 91 down an incline 92, under which is located a vibrator means 93. Said electric vibrator means causes the ties, which may bunch up, catching on one another, to slowly feed down the incline to the tie dropper feed assembly in Fig. 6, from which the tying arm assembly 70 picks them off to crimp the bag and tie it. Mounted on the under side of the feeding means are small angle irons 94 and 95, oppositely disposed to one another and intermediate the ends of the tie. The ties feed down said incline 92 under the action of the vibrator, and slide between said angle irons which have a wedge-shaped mouth down to the tie dropper assembly. Said assembly consists of a shaft 96, bearings on the shaft and a plurality of arms 97 with slots for receiving a tie. The end of the feed means is adapted to meet the arcuate end of the arms. On one end of the shaft 96 is mounted an arm 98 which is contacted by a solenoid 99 to turn the shaft by a limited amount, permitting the tie dropper assembly to drop a tie, which is picked off the feed rack, upon a magnet near the crimped neck of the bag and above the tying arm assemblies. To assure that the tie drops properly there is a steel guide 101 on the left and a spring catcher 100 on the right, which forces the tie into the tying arm hooks as they move into twisting position. The tie lands upon the magnet and is held there and thus does not jar out of position waiting for the receipt of the tying arm assembly as it is moved backward by the tying arms and the pull-back mechanism. This operation is explained elsewhere in the specification.

Figure 6:
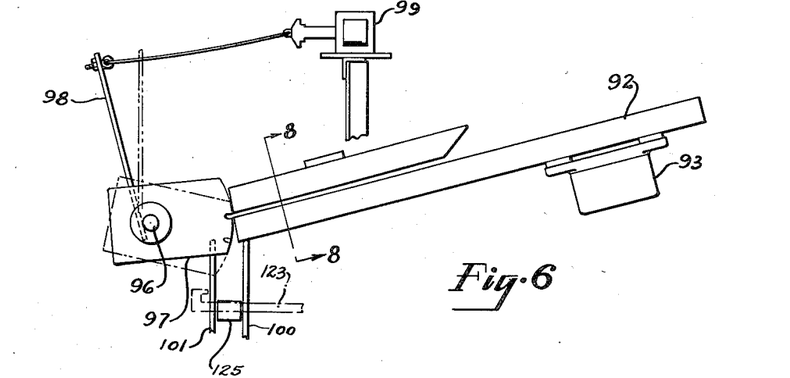
Fig. 6 is a horizontal view of the tie dropper, not to scale, showing the vibrator and feed mechanism.
Figure 7:
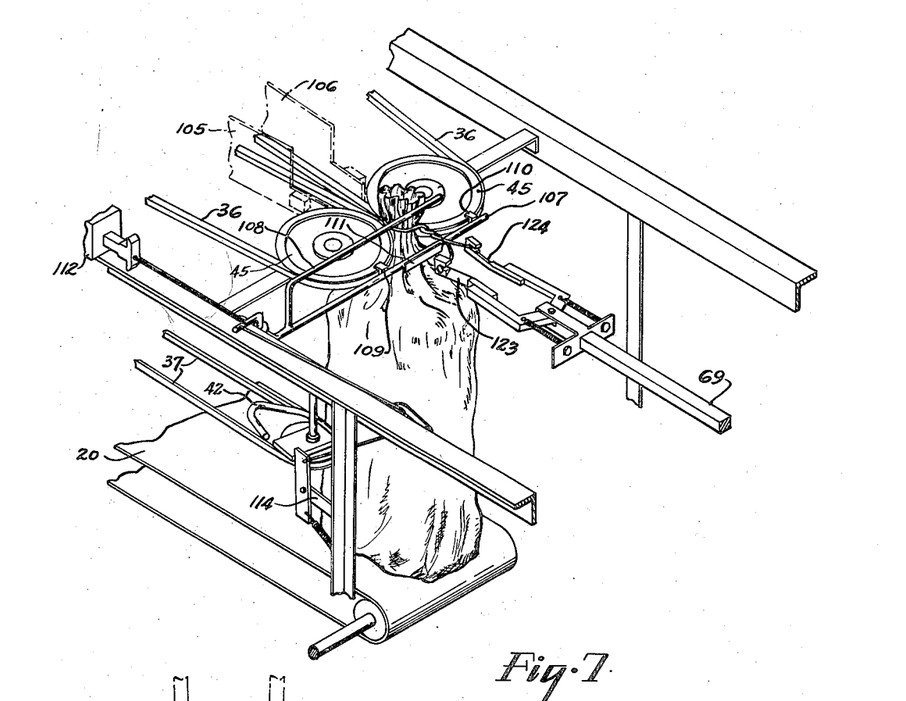
Fig. 7 is a schematic view of the portion of the apparatus showing the crimping belts, pulleys and crimp holder, showing a bag in position being crimped and tied.

The electrically operated vibrator mechanism 92, spaced near the end of the sloped feeding means, provides the necessary jarring action to separate the ties from one another, and causes them to feed down the slide. The angle irons at the lower section of the feeding means have a tapered edge or wedge-shaped mouth to separate the ties from one another as they approach the tie dropper assembly, so that a number of ties will not go through the mechanism at one interval.

Conveyors and crimping belt drive

Figure 2:
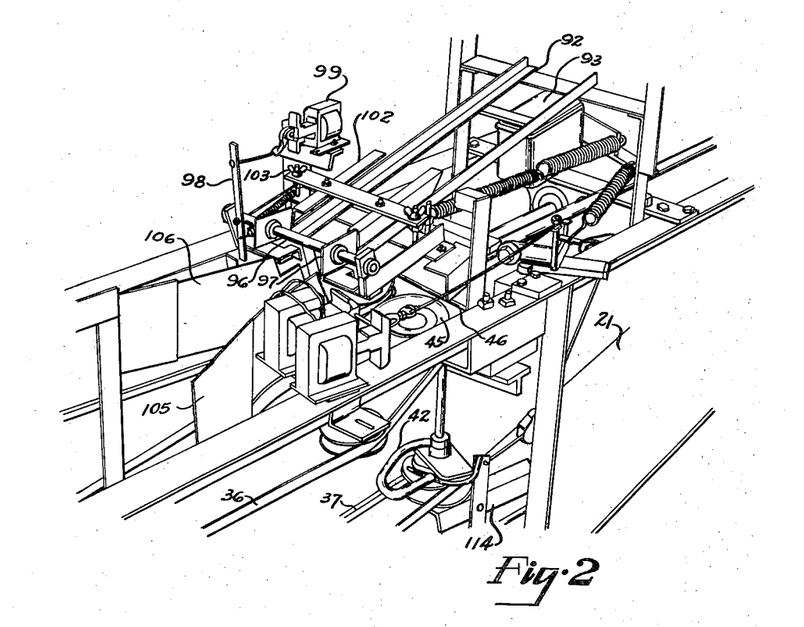
Fig. 2 is a close-up view of the feed means for the wire ties, showing the crimping belts as well.
Figure 10:
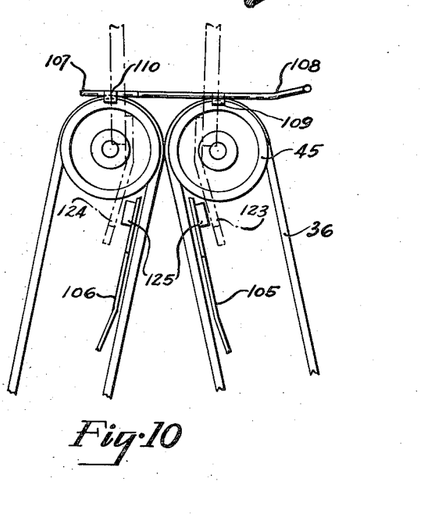
Fig. 10 is a plan view of the crimping belts and pulleys and crimp holders.

The gear reduction unit 23 drives the longitudinal shaft 24 through a pair of bevel gears to a cross-shaft 25 and to vertical shafts by means of two other sets of bevel gear pairs 41 to the crimping belts. A sprocket on shaft 25 drives the conveyor belts by means of a chain drive. To bevel gear pairs 41 drive shaft 104 and its companion shaft 104, which are the vertical shafts driving the crimping V belts 36 through pulley 38. These shafts are turning in opposite directions, so that the V belts proceed toward each other as they converge on the two pulleys 45 and are in pressure friction contact there. On either side of the crimping belt in Figs. 2 and 10 are end plates or guide members 105 and 106, which prevent miscellaneous folds or puckers from extending over and around the V belts, and permit the bag to be more readily crimped into the throat or neck between the pulleys 45 and the crimp holder 46. The conveyor 20 is adjustable vertically at 32 so that various sizes of bags can be tied. In practice, however, the conveyor is adjusted so that the top of the bag to be tied is about four inches above the crimping belt. The plane of the conveyor is parallel with that of the crimping belt for best results. Also, the conveyor belt is running at the same speed or slightly slower than the crimping belt.

The crimp holder

After the neck of a bag has passed through the V belts and passed the crimping pulleys, which are in pressure friction contact through the V belts, it is forced by the V belts into a narrow section on the other side of the crimping pulleys 45 and is retained in said small section by a crimp holder 46 shown particularly in Fig. 10. This crimp holder is made up of several bars, 107 which is the lower bar, and 108 the upper, which are fastened to a shaft, which turns on a bearing. At one end of the crimp holder there is a U-shaped piece, or shoe, of metal 109 which prevents the bag from being pulled between the crimp holder member and the crimping pulleys and belts thereon. This shoe provides a tight connection between the crimping pulleys 45 and the crimp holder. Similarly, intermediate the end of the bearing, there is a second shoe 110 adapted to conform to the other crimping pulley, and to prevent the same thing happening on this pulley. Further, the crimp holder has mounted upon it an extension arm 111 vertically downward, to prevent the bag from bulging out beneath the crimp holder. Serious bulging at this point would cause the bag to be turned by the tying hooks during the initial revolution of the tying arm assembly. The crimp holder solenoid 112 is fastened through a connection through a latch in such a way that when the solenoid is energized the latch will release immediately and a bar 113 will be pulled towards the solenoid, thus swinging the crimp holder away from the crimping pulleys 45. This occurs after the bag has been tied. The extension spring acts as a return spring for the crimp holder 46. At the same time the crimp holder is being released, the same solenoid operates a latch or clutch on a "kickoff mechanism" 42, so that a single revolution of said mechanism will give an extra shove to the bag to cause it to fall off the end of the conveyor belt onto said discharge conveyor 21. Said kick-off means is driven by a pulley from the vertical shafts 115 which drive the crimping pulleys.

Cam and cam shaft operation

Figure 11:
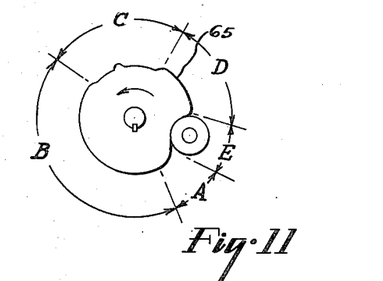
Fig. 11 is an end view of the cam shaft, cam and follower.

In connection with the cam shaft and cam mechanism for forcing the tying arms backward to grab the tie and twist it, a cam 65 is designed of specific shape to initiate certain movements in the tying arm assembly to cause the pick-up and pull back of the tying arm shaft 69. Said cam is of the shape and configuration shown in Fig. 11 and has five portions. They are portion A of the cam which forces the cam follower outward and the tying arms back rapidly, as the tie is put around the bag. During section B the tying arms are held in their rearmost position. The intermittent gears are in mesh and the tie is twisted. During section C the tying arms move forward a small amount because of the depression on the cam segment, and are then pulled back momentarily by the pump. The operation is repeated again, thus giving two opportunities for the tying hooks to disengage the tie. At the beginning of section D an arm mounted on the cam shaft operates the cam switch, thus de-energizing the clutch and tie dropper solenoid, and energizing the crimp holder solenoid. During section D on the cam the tying arms are moved to their rearmost position and held there. This allows the bag to drop out of the crimping area without any interference from the tying hooks or arms. During section E the cam follower moves forward again to complete the cycle.

Electrical controls

Figure 5:
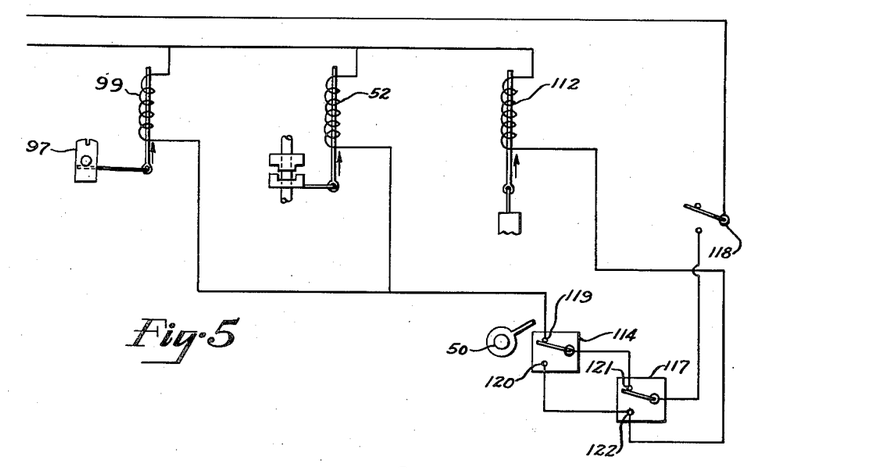
Fig. 5 is a schematic view of a simplified electrical control circuit for the apparatus.

To understand the electrical controls for this device, a simplified electrical diagram is illustrated in Fig. 5. In this diagram 99 is the tie dropper solenoid, 52 the clutch solenoid and 112 the crimp holder solenoid. In addition there are certain mechanical switches, particularly there is a single pole and double throw switch 119 which is operated by the cam shaft. There is another switch operated by the crimp holder. This is shown at 117, and still another switch 118 operated by the bag itself. The operation of this electrical control is as follows:

The bag moves in the crimping area, defined by the crimping pulleys 45 and the crimping holder 46, and closes switch 118. This energizes the tie dropper solenoids 99 and clutch solenoids 52. Toward the end of the tying cycle the arm on the cam shaft momentarily throws switch 114 from position 119 to 120. This de-energizes solenoids 99 and 52, i. e., the tie dropper and clutch solenoids, and energizes the crimp holder solenoid 112. This opens the crimp holder and at the same time throws switch 117 from 121 to 122, which results in holding solenoid 112, i. e., the crimp holder energized after switch 114 has returned to its original position 119. When the bag falls from the tying area, switch 118 opens, thus de-energizing solenoid 112. This allows the crimp holder to close and throws switch 117 from 122 to 121.

Thus it may be seen that the complete cycle is finished, as shown above, and only three solenoids are necessary to perform the complicated series of motions, and the delicate timing required.

A further important point in connection with this apparatus is the design and construction of the tying hooks 123 and 124 and their function during the pull-back and twisting operations. In tying, the wire is under considerable stress where it is held by the hooks. As is seen from the drawing, the hook member holds the loop end in a narrow groove in the hook. In operation the hook moves back and picks up a tie from the magnet 125, with each of the loops outwardly disposed from said hook. The wire of which the tie is made is annealed and may be bent readily without breaking. Thus it will be seen that the stress does not break the wire tie. However, the tying hooks must be properly designed or the tie may jam or bind in the hooks, thereby delaying the release and jam the machine. As will be seen in the figures the slots of the hook are larger than the diameter of the tie. Consequently, the only place that the tie is held is where the knot in the end of the tie pulls against the edges of the tying hook. This eliminates all binding of the wire tie inside the tying hook slots. When the hooks move forward the ends of the tie will remain stationary if there is not too much binding at this point. This is, of course, only when the tying arms are in closed position. This allows the ends of the hooks to slide past the knot ends of the tie. Following this the tying arms spring apart. The reason the ends of the tie will remain stationary as the hooks slide away from it, is that the tie contains a considerable amount of stiffness from its twisted section. Further it may be seen that the stub ends of the tie, i. e. the distance from the end of the twisted section to the end of the tie, are very short, and thus do not bend easily. There is, of course, no need in this combination for a particular shape to the tying arms in order to permit the ready release of the tying arms.

As shown in the drawings, the tying arms angulate sharply inward and then flair outward. In the release the knotted ends of the tie have some side clearance as the hooks move forward. This facilitates release. There is, of course, some spring tension pulling the hooks apart and against the tie, this force is small in comparison with the "sets" or jamming action that occurs between the knotted ends of the tie and the sides of the hook as a result of pulling and twisting. To further minimize binding or jamming of the tie in the hooks, the sections forming the hooks immediately outwardly of the hook section, are triangular in shape, with a flat side down and inward in each case with the hypotenuse of the triangle facing outwardly to reduce the jamming. This permits the knot of the tie to slide freely over the tying arms as they spring apart. In addition, the length of the tying hooks is kept as short as possible, so that they will have to travel only a minimum distance before the release takes place. This is important, since the distance between the ends of the tie and the bag neck is limited.

From the foregoing description it may readily be seen that the construction of this machine has been explained in connection with a preferred mode of performing the various motions necessary to crimp and tie the bag with a twisted tie, certain of these motions being mechanical and other electrically operated in a time cycle to accomplish the means rapidly and efficiently, permitting the cycle to vary occasionally because of the numerous variables which can take place. It will be readily seen that some of these operations can be substituted by mechanical equipment, but it is intended that these changes are meant to be included within the scope of this invention.

We claim:

1. In an automatic bag tying machine, crimping means for crimping the neck of a bag, tie positioning means to place a tie in the vicinity of the neck to be crimped, tying arms disposed on either side of the neck to pick up the tie, means for wrapping said tie about the neck and twisting it, and means to release said tying arms and said crimping means.

2. In an automatic bag tying machine, conveyor means for a filled bag of aggregate, discharge means for said bag, crimping belts for the neck of the bag approaching one another, terminating in a pair of crimping pulleys, crimp holder means contacting said pulleys on the outward side thereof to form an enclosed portion into which the neck of a bag may be forced, tie dropper means on one side of the bag to be tied, tying arms disposed on the same side but actuated from the opposite side to pick up the tie in a pair of hooks, retracting the tie around the neck of the bag and twisting it several times to form a tie, releasing means for said tying arms to release the tie, retracting means for the tying arm and releasing means for said crimp holder to discharge the crimped and tied bag.

3. In an automatic bag tying machine, conveyor means for a filled bag of aggregate, crimping means adapted to contact the neck of a bag terminating in a pair of crimping pulleys with pressure friction contact therebetween, crimp holder means contacting said pulleys on the outward side thereof to form an enclosed portion into which the neck of a bag is forced, loop end tie feeder means on one side of a bag to be crimped, tying arms actuated from the other side but disposed on said first side, said arms being adapted to pick up the tie in a pair of hooks at the end thereof and retracted, forcing said tie around the neck of a bag and twisting it, releasing means for said tying arms and releasing means for said crimp holder to discharge a bag.

4. In an automatic bag tying machine for crimping and tying a filled bag of aggregate, crimping means for the neck of a bag, loop end tie feed means on one side of a bag to be tied, tying arms actuated from said opposite side, actuating means for said tying arms to advance the arms to pick up a tie and retract the tie around the crimped neck of a bag and twist it, releasing means for said tying arms from the tie and releasing means for the crimped neck of a bag.

5. In an automatic bag tying machine having as component parts thereof an incoming conveyor and discharge conveyor spaced downwardly from said first conveyor, crimping means for the neck of a bag comprising a pair of crimping belts terminating in crimping pulleys and a crimp holder adapted to contact the crimping pulley and crimping belts to form an enclosed portion, loop tie feed means, tying arms and actuating means for the tying arms to pull the tie around a bag and twist same, discharge means comprising releasing means for said crimp holder following the completion of the tying operation, kick-off means at the end of the loading conveyor in the vicinity of the tying operation, said kick-off means consisting of a shaft and an arm operating in timed sequence with the crimp holder to release the crimped bag and to force it, by means of the arm, off the end of the load conveyor onto the discharge conveyor spaced downwardly therefrom.

6. In a crimping apparatus for a bag tying machine, a pair of crimping pulleys, crimping belts surrounding the pulleys in pressure friction contact, and forming an acute angle with one another, retaining members internally of the belts and upwardly from the belts extending from the immediate vicinity of the crimping pulleys downwardly therefrom, said retaining members adapted to hold and retain the upper portion of a bag, as it is being crimped, to facilitate the formation of a tie around a bag.

7. In a crimping apparatus for a bag tying machine, the combination of a pair of horizontally disposed pulleys in contact with one another, a pair of crimping belts surrounding the pulleys and forming an acute angle with one another, power means for advancing the belts toward the crimping pulleys at the same speed, guiding means for the neck of a bag consisting of a pair of plates secured within the confines of the belts, adjacent the crimping pulleys and oppositely disposed to one another, said guides being adapted to confine a bag in a closed portion bound by the crimping belts at least momentarily, before a bag is flattened and crimped.

8. In a crimping apparatus for a bag tying machine, comprising in combination a pair of horizontally disposed pulleys in contact with one another, a pair of crimping belts surrounding the pulleys and in pressure friction contact, and forming an acute angle with one another, power means for advancing the belts toward the crimping pulleys at the same speed, retaining means in the form of a crimp holder outwardly of the crimping pulleys and forming a triangular portion with said pulley and belts, to confine a bag in a closed portion to permit the bag to be tied.

9. The crimping apparatus of claim 8, in which there is a vertical extension downwardly from the crimp holder to provide for close retention of the bag and the neck thereof during the tying operation, and further in which there is a contact means between said retaining means and said pulleys in the form of flange members on either side of the pulley to prevent the loose ends of the bag from working between the crimping pulleys and belts and the retaining means during the tying operation.

10. In a tying arm assembly for an automatic bag tying machine combination, a horizontally disposed tying shaft, having a pair of tying arms extending therefrom with hooked ends reciprocally mounted in the horizontal plane, actuating means for said tying and twisting arms to permit the tying arms to be disposed forward around the crimped neck of a filled bag of aggregate, to pick up a tie, retract, twist and release said tie, said actuating means consisting of a horizontally disposed shaft, a cam on said shaft, means between said cam and said tying arm shaft and arms whereby the rotation of said shaft and cam will actuate said tying arms in advancement and retraction in a timed sequence, and power means for said tying arms.

11. In a tying arm assembly for an automatic bag tying machine, the combination of a horizontally disposed tying shaft having a pair of tying arms extending therefrom with hooked ends reciprocally mounted in the horizontal plane, actuating means for said tying and twisting arms to permit the tying arms to be disposed forward around the crimped neck of a filled bag, to pick up a tie, retract, twist and release said tie, said actuating means consisting of a horizontally disposed shaft driven at a constant speed, a cam portion on said shaft, a vertically disposed shaft having a pair of arms, one of said arms having a cam follower in contact with said cam, the other of said arms contacting the tying shaft through a linkage means, whereby the rotation of the horizontally disposed shaft will actuate the cam follower and consequently the tying arm assembly in advancement and retraction in a timed sequence, and power means for said tying arm to rotate the arms after pick-up of the loop tie to twist the tie around the neck of a bag at the correct moment in the sequence.

12. The actuating means for a tying arm apparatus for an automatic bag tying machine of claim 11, in which the horizontally disposed shaft has an intermittent gear in the timed cycle, which rotates the tying arm shaft at the correct moment a specified number of turns to twist the tie around the neck of a bag.

13. In a method of crimping and tying a filled bag of aggregate with a twisted tie, the steps of which consist of crimping a bag, placing a tie on one side of the neck of a crimped bag, disposing tying means around the neck of a bag to pick up a tie, retracting said tying means around the neck of a bag and twisting said tie and releasing the tying means.

14. In a method of crimping and tying a filled bag of aggregate with a loop end twisted tie, the steps of which consist of crimping a bag, disposing tying arms on one side of a bag actuated from the opposite side to pick up the loop end tie, placing a loop end twisted tie on the same side of the crimped neck of a bag, retracting said tying arms and twisting them about the neck of a bag and releasing said tying means and crimping means.

15. In a method of crimping and tying a filled bag of aggregate, the steps of which consist of crimping the neck of a bag, disposing tying means consisting of hooks and arms around a crimped neck of a bag in which the hooks of the tying means are on one side and the arm extending around the bag and from the opposite side, placing a loop end twisted tie behind the crimped neck on a magnetized portion of metal, retracting said tying arms around the crimped neck, picking up the tie, and twisting said arms to form a twisted tie, and releasing said tying arms from the twisted tie and releasing said crimping means from the bag.

16. In a method of automatically crimping and tying a bag, the steps of which consist of crimping a bag, disposing tying means around the crimped neck of a bag, fitting a tie in the vicinity of the crimped neck of the bag adjacent the said tying means, retracting said tying means to pick up said tie, to wrap the tie around the crimped neck of a bag, twisting said tying means and releasing said bag and tie.

17. The method of releasing tying arms from a twisted tie around the crimped neck of a bag in an automatic bag tying machine, which consists of moving said arms away from the ends of the twisted tie and outwardly thereof, and then past said ends and repeating said movements in the event that the tie was retained by the tying arm hooks in said first series of movements.

References Cited in the file of this patent
UNITED STATES PATENTS

| | | |
|---|---|---|
| 1,373,939 | Bates | Apr. 5, 1921 |
| 1,551,522 | Erickson | Aug. 25, 1925 |
| 1,551,525 | Hamer | Aug. 25, 1925 |
| 1,962,902 | Kunath | June 12, 1934 |
| 2,070,165 | Griffith | Feb. 9, 1937 |
| 2,267,532 | Moberg | Dec. 23, 1941 |
| 2,276,919 | Brassel et al. | Mar. 17, 1942 |